(12) United States Patent
Massaguer et al.

(10) Patent No.: US 11,573,881 B1
(45) Date of Patent: Feb. 7, 2023

(54) ROLE-BASED FAILURE RESPONSE TRAINING FOR DISTRIBUTED SYSTEMS

(71) Applicant: Amazon Technologies, Inc., Seattle, WA (US)

(72) Inventors: Daniel Massaguer, Portland, OR (US); Ryan Hicke, Portland, OR (US); Katy Humble, Beaverton, OR (US); Dhiraj Chaudhary, Hillsboro, OR (US)

(73) Assignee: Amazon Technologies, Inc., Seattle, WA (US)

( * ) Notice: Subject to any disclaimer, the term of this patent is extended or adjusted under 35 U.S.C. 154(b) by 235 days.

(21) Appl. No.: 16/914,114

(22) Filed: Jun. 26, 2020

(51) Int. Cl.
| | |
|---|---|
| G06F 11/34 | (2006.01) |
| G06K 9/62 | (2022.01) |
| A63F 13/46 | (2014.01) |
| A63F 13/57 | (2014.01) |
| G06N 20/00 | (2019.01) |

(52) U.S. Cl.
CPC .......... G06F 11/3457 (2013.01); A63F 13/46 (2014.09); A63F 13/57 (2014.09); G06K 9/6256 (2013.01); G06N 20/00 (2019.01)

(58) Field of Classification Search
CPC ...... G06F 11/3457; A63F 13/46; A63F 13/57; G06N 20/00; G06K 9/6256
See application file for complete search history.

(56) References Cited

U.S. PATENT DOCUMENTS

| | | |
|---|---|---|
| 6,996,514 B2 | 2/2006 | Gruber |
| 7,539,597 B2 | 5/2009 | Wegerich et al. |
| 7,702,965 B1 | 4/2010 | Planki et al. |
| 8,095,337 B2 | 1/2012 | Kolbet et al. |
| 8,457,942 B1 | 6/2013 | Harrison et al. |
| 8,719,065 B2 | 5/2014 | Work et al. |
| 10,133,614 B2 | 11/2018 | Mankovskii et al. |
| 10,628,293 B1 | 4/2020 | Weiner |
| 2012/0258437 A1* | 10/2012 | Sadeh-Koniecpol ... G06F 21/56 434/362 |
| 2013/0167707 A1* | 7/2013 | Shimizu ................. G09B 15/00 463/9 |
| 2014/0199663 A1* | 7/2014 | Sadeh-Koniecpol ........ H04L 63/1408 434/118 |
| 2015/0094139 A1* | 4/2015 | Kargar .................... A63F 13/61 463/29 |

(Continued)

*Primary Examiner* — Steve Rowland
(74) *Attorney, Agent, or Firm* — Robert C. Kowert; Kowert, Hood, Munyon, Rankin & Goetzel, P.C.

(57) ABSTRACT

Methods, systems, and computer-readable media for role-based failure response training for distributed systems are disclosed. A failure response training system determines a failure mode associated with an architecture for a distributed system comprising a plurality of components. The training system generates a scenario based at least in part on the failure mode. The scenario comprises an initial state of the distributed system which is associated with one or more metrics indicative of a failure. The training system provides, to a plurality of users, data describing the initial state. The training system solicits user input representing modification of a configuration of the components. The training system determines a modified state of the distributed system based at least in part on the input. The performance of the distributed system in the modified state is indicated by one or more modified metrics differing from the one or more initial metrics.

20 Claims, 8 Drawing Sheets

(56) References Cited

U.S. PATENT DOCUMENTS

| | | | |
|---|---|---|---|
| 2015/0278158 A1* | 10/2015 | Singh | G06Q 50/01 |
| | | | 703/2 |
| 2016/0274904 A1* | 9/2016 | Niazi | G06F 8/71 |
| 2019/0180635 A1* | 6/2019 | Jennings | G06N 20/00 |
| 2019/0303583 A1* | 10/2019 | Hosking | G09B 5/06 |
| 2020/0272112 A1* | 8/2020 | Carullo | G05B 13/0265 |
| 2021/0082309 A1* | 3/2021 | Rosenberg | G09B 19/0053 |
| 2021/0182767 A1* | 6/2021 | Tibrewala | G06F 8/70 |

\* cited by examiner

ROLE-BASED FAILURE RESPONSE TRAINING FOR DISTRIBUTED SYSTEMS

BACKGROUND

Large-scale computing systems, such as those associated with network-based production services, have become widely available in recent years. Examples of such systems include online merchants, internet service providers, online businesses such as photo processing services, corporate networks, cloud computing services, web-based hosting services, etc. These entities may maintain large numbers of computing devices (e.g., thousands of hosts) which are hosted in geographically separate locations and which are configured to process large quantities (e.g., millions) of client requests daily or even hourly. Systems that use interconnected computing devices to perform tasks may be referred to as distributed systems. Distributed systems may include many services and subsystems that interact with one another in a variety of ways to perform tasks on behalf of clients.

A distributed system may experience reduced functionality or become unavailable to clients for a variety of reasons. For example, a distributed system may be subjected to a denial-of-service cyberattack in which the system is flooded with malicious requests such that genuine requests cannot be processed. As another example, a distributed system may experience high latency and dropping of client requests due to a misconfiguration of software or a hardware failure. When such a failure occurs, it is vital for the operator of the distributed system to restore the functionality of the system as soon as possible. A team of users may be tasked with performing the failure response.

Figure 1:
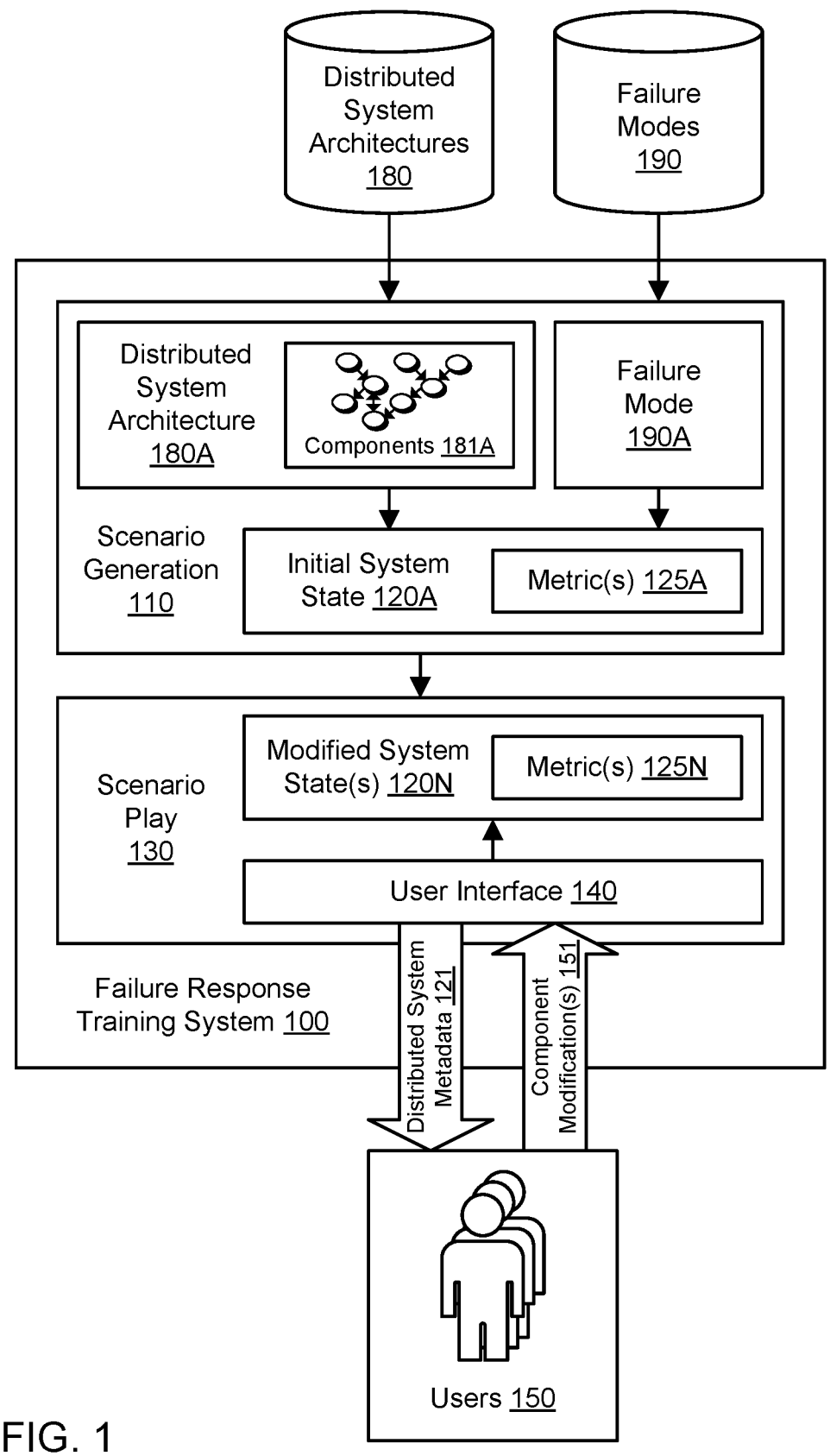
FIG. 1 illustrates an example system environment for role-based failure response training for distributed systems, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for role-based failure response training for distributed systems are described. A distributed system may include numerous interconnected components, such as services of a cloud-based provider network, which collaborate to perform tasks. A distributed system may fail in a variety of ways, and the manner in which a distributed system fails may be referred to as a failure mode. Failure of a distributed system may result in the system being unavailable to process new requests or perform tasks, having limited availability to process new requests or perform tasks, processing requests or performing tasks with an excessively high latency, and so on. A failure in a distributed system may be referred to as an operational event. For example, an online ordering system for an electronic catalogue may be implemented as a distributed system with interconnected components that collaborate to accept orders from customers. If an underlying data storage service used by such a system fails, then the ordering system may also fail, resulting in inconvenience for customers and lost revenue for merchants until the ordering system is restored to a normal level of functionality.

To mitigate the effects of failures in distributed systems, organizations may develop failure response frameworks. A failure response framework may include one or more procedures to be performed by a team of users to restore a distributed system to a normal level of functionality after an operational event is detected. For example, the tasks may include reconfiguring components of distributed systems (e.g., services, servers, and network components), rebooting servers, replacing servers, adding servers to a fleet, rerouting network traffic between components, and so on. To respond to operational events as quickly as possible, it is desirable to train teams of users to understand how the various components of distributed systems work individually, how the components work together, how the components can be reconfigured or modified to improve performance and return to normal functionality, and so on. Additionally, it is desirable to train teams of users to communicate effectively and solve problems in a collaborative manner when operational events occur.

The aforementioned challenges, among others, are addressed by embodiments of the techniques described herein, whereby automated techniques may be used to develop failure response frameworks so that organizations may respond quickly and effectively to failures in distributed systems. Failure response frameworks may be developed using multi-player role-playing techniques in which users having different roles work together to restore a distributed system to a normal level of functionality during a training exercise referred to as a scenario. For a given distributed system architecture, a scenario may be generated based (at least in part) on a particular failure mode. The architecture may represent a well-known reference architecture, a user-specified architecture, or a new and automatically generated architecture. The failure mode may represent an observed failure mode or a new and automatically generated failure mode. The game scenario may include an initial state of the distributed system in which metrics indicate that one or more components are failing. While "playing" the scenario, a team of users in different roles may modify the configuration of components or perform other tasks to modify the distributed system until metrics indicate that normalcy has been re-established. A team of users may be assigned a score, e.g., according to the speed or effectiveness of their response to the failure. By training users to respond to a variety of failure scenarios in a variety of distributed system architectures, the speed and quality of future responses to operational events may be improved.

As one skilled in the art will appreciate in light of this disclosure, embodiments may be capable of achieving certain improvements to computer technology, including some or all of the following technical effects: (1) improving the speed at which functionality is restored to distributed systems and reducing system downtime via development of failure response frameworks; (2) reducing the use of computer systems for training users in failure response by simulating a failure scenario instead of executing the components of a distributed system; (3) improving the development of failure response frameworks for distributed systems by using machine learning to identify new failure modes; (4) improving the development of failure response frameworks for distributed systems by using machine learning to generate new failure modes; (5) improving the development of failure response frameworks for distributed systems by using machine learning to generate new distributed system architectures for failure response scenarios; and so on.

FIG. 1 illustrates an example system environment for role-based failure response training for distributed systems, according to some embodiments. A failure response training system 100 may be used by one or more organizations to develop failure response frameworks. A failure response framework may include one or more tasks performed by a team of users 150 to restore a distributed system to a normal level of functionality after an operational event is detected. For example, the tasks may include reconfiguring components of distributed systems, rebooting servers, replacing servers, adding servers to a fleet, rerouting network traffic between components, and so on. To respond to future operational events as quickly as possible, the system 100 may permit an organization to train teams of users 150 to understand how the various components of distributed systems work individually, how the components work together, how the components can be reconfigured or modified to improve performance and return to normal functionality, and so on. Additionally, the system 100 may permit an organization to train teams of users 150 to communicate effectively and solve problems in a collaborative manner when operational events occur in the future.

A distributed system may be implemented according to a distributed system architecture. A distributed system architecture may include numerous interconnected components, such as services of a cloud-based provider network, that collaborate to perform tasks according to configurations of components and connections between components. Failure of a distributed system may result in one or more of the components being unavailable to process new requests or perform tasks, having limited availability to process new requests or perform tasks, processing requests or performing tasks with an excessively high latency, and so on. A failure in a distributed system may be referred to as an operational event or an incident. For example, a distributed system may be subjected to a denial-of-service cyberattack in which the system is flooded with malicious requests such that genuine requests cannot be processed. As another example, a distributed system may experience high latency and dropping of client requests due to a misconfiguration of software or a hardware failure. Such an operational event may be associated with a failure mode that represents a manner in which the system failed. For example, a failure mode may include a wall clock at a server falling behind such that messages generated by the server are rejected by recipients due to an out-of-date timestamp. As another example, a failure mode may include a network fault between two servers such that a retry storm is created. When such an event occurs, it is vital for the operator of the distributed system to restore the functionality of the system as soon as possible.

The failure response training system 100 may use automated techniques to develop failure response frameworks so that organizations may respond quickly and effectively to failures in distributed systems. Failure response frameworks may be developed using multi-player role-playing techniques in which users 150 having different roles work together to restore a distributed system to a normal level of functionality during a training exercise referred to as a scenario. The failure response training system 100 may include a component for scenario generation 110. The scenario generation 110 may select or generate a distributed system architecture 180A and a failure mode 190A for that system architecture.

The selected architecture 180A may include a plurality of components 181A such as one or more services, microservices, servers, storage resources, network components, cloud network primitives, auto-scaling configurations, front end processes, back end processes, and so on. The architecture 180A may include software and/or hardware configurations for the components 181A, e.g., the version of a service installed on a server, the number of hosts in a fleet, the processor configuration and capabilities of a server, the memory configuration of a server, the storage configuration of a server or storage resource, the network configuration of components, and so on. The architecture 180A may include connections or dependencies from component to component, e.g., inputs of components, outputs of components, application programming interfaces (APIs) or other programmatic interfaces of components, and so on.

In some embodiments, the architecture 180A may be selected from a plurality of distributed system architectures 180. The distributed system architectures 180 may include one or more well-known reference architectures, one or more user-specified architectures, and/or one or more automatically generated architectures (e.g., as generated using machine learning techniques). Reference architectures may represent common patterns for types of distributed systems. For example, the reference architectures may include a system architecture for a media streaming service, a system architecture for a web server, and so on. The user-specified architectures may represent arbitrary sets of components and relationships between components as specified by users, e.g., users 150 or users tasked with creating scenarios. In some embodiments, the architecture 180A may be selected based (at least in part) on user input. In some embodiments, the architecture 180A may be selected automatically by the system 100. Selection of the architecture 180A may leave one or more other architectures unselected in the repository of architectures 180.

For a given distributed system architecture 180A, a scenario may be generated based (at least in part) on a particular failure mode 190A. The failure mode 190A may represent a manner in which the selected system architecture 180A can fail. In some embodiments, the failure mode 190A may be selected from a plurality of failure modes 190. The failure modes 190 may include one or more failure modes observed in a real-world environment and/or one or more automatically generated failure modes (e.g., as generated using machine learning techniques). In some embodiments, the failure mode 190A may be selected based (at least in part) on user input. In some embodiments, the failure mode 190A may be selected automatically by the system 100. Selection of the failure mode 190A may leave one or more other failure modes unselected in the repository of failure modes 190.

The scenario may be referred to as a training scenario or a game scenario. The scenario may include an initial state 120A of the distributed system in which one or more metrics 125A whose values indicate that one or more components are experiencing failure according to the selected failure mode 190A. The metric(s) 125A may describe the performance or health of computing devices, services as a whole, and/or networking components using metrics for processor usage, memory usage, storage usage, network usage, and so on. For example, for one particular failure mode 190A, the metric(s) 125A may indicate that a particular server has a 90% processor utilization, resulting in high latency or dropped requests. As another example, for one particular failure mode 190A, the metric(s) 125A may indicate that calls from one service to another service are not being acknowledged or processed, resulting in unavailability of the entire system. In some embodiments, the scenario may be associated with a complexity or difficulty value. For example, one scenario may be intended for beginners, another scenario may be intended for intermediate users, and yet another scenario may be intended for experts. The scenario may be generated based (at least in part) on a desired complexity or difficulty value.

The failure response training system 100 may include a component for scenario play 130. Using the scenario play 130, a team of users 150 may be presented with metadata 121 regarding the state of the distributed system in the scenario. For example, the metadata 121 may include the metric(s) 125A and their current values. The metadata 121 may be updated as the state of the system changes over time and transitions into one or more modified system states 120N. As indicated in updated metadata 121, the modified system state(s) 120N may include one or more modified metrics 125N whose values indicate the current health or performance of one or more components. For example, the metric(s) 125N may represent the same metric(s) 125A for the same components but with updated values. Changes to the values of these metrics 125A-125N may indicate changes in the health or performance of the distributed system over time. In some embodiments, the metadata 121 may be updated for the team of users 150 for the initial system state 120A and for every transition to a new system state 120N.

During the scenario play 130, one or more of the users 150 may submit one or more modifications 151 to components 181A and/or their configurations. For example, the modifications 151 may include changing the number of hosts in a fleet, changing the configuration of one or more servers, rebooting a server, replacing a server, rerouting network traffic between components, installing software on a server, adding storage to a server, and so on. As a result of these modifications 151 and/or the passage of time, the distributed system in the scenario may experience a higher degree of failure as problems cascade from one component to another (as indicated by the updated metric(s) 125N or other metadata 121). However, as a result of the modifications 151, the distributed system in the scenario may experience a lower degree of failure as problems are mitigated or eliminated (as indicated by the updated metric(s) 125N or other metadata 121).

The metadata 121 may be provided to the users 150 via a user interface 140. The user interface may include one or more graphical user interfaces, one or more command-line interfaces, one or more voice interfaces, and so on. The user interface 140 may represent a unified gameplay interface and/or a set of existing interfaces for different aspects of the distributed system. The user interface 140 may include consoles or alerting systems by which system metadata 121 may be presented to the users 150. In some embodiments, the metadata 121 and/or metric(s) 125A-125N may be provided only on user request, and users 150 may learn to find the most relevant metrics and/or metadata using the interface 140. The user interface 140 may include operator tools for components 181A by which users 150 may submit modifications 151 to components 181A and/or their configurations. For example, the user interface 140 may permit an operator of a service to change the number of hosts in a fleet, change the configuration of one or more servers, reboot a server, replace a server, reroute network traffic between components, install software on a server, add storage to a server, and so on.

In some embodiments, the scenario play 130 may reach an end state in which the failure is deemed to be eliminated and a normal level of functionality is restored. The end state may be determined according to values of the metric(s) 125N. For example, the end state may be reached when the availability of the system increases past a particular threshold value after being too low in the initial state 120A. As another example, the end state may be reached when the latency of request processing by the system decreases below a particular threshold value after being too high in the initial state 120A. In some embodiments, the scenario play 130 may be terminated without restoration of a normal level of functionality after a certain period of time has elapsed.

In some embodiments, the team of users 150 may be assigned scores at intermediate points in the scenario play between the initial state and the end state. The intermediate scores may represent progress toward the end state. The team of users 150 may be assigned a final score when the end state is reached or when the scenario times out. The final score may be determined based at least in part on the speed or effectiveness of the users' response to the failure. In some embodiments, different scores may be used to certify users at certain levels of proficiency. In some embodiments, average scores of other teams for the same scenario may be reported along with the final score for the current team 150. By training users to respond to a variety of failure scenarios in a variety of distributed system architectures, the speed and quality of future responses to operational events may be improved.

Figure 8:
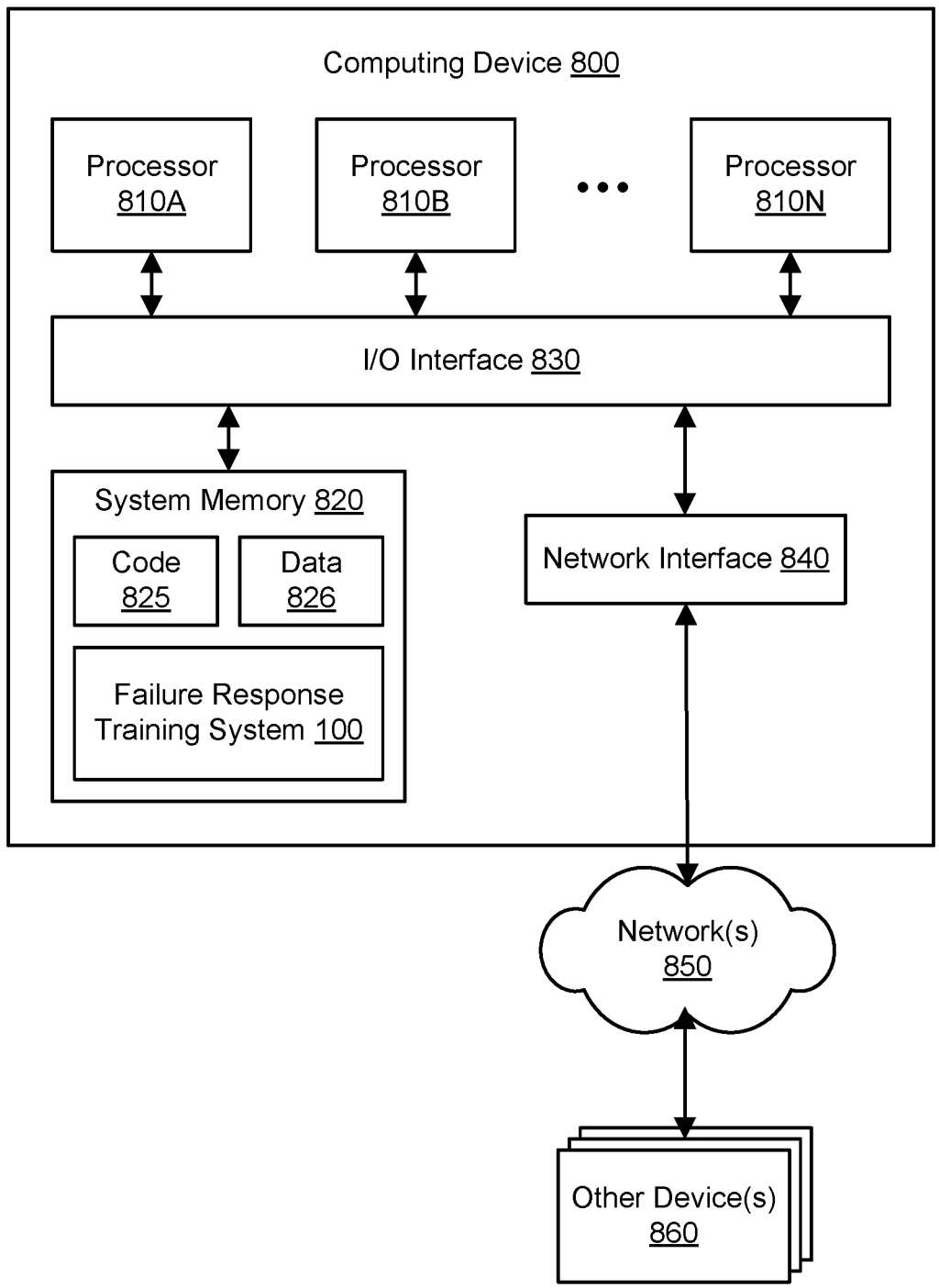
FIG. 8 illustrates an example computing device that may be used in some embodiments.

The failure response training system 100 may be implemented using any suitable number and configuration of computing devices, any of which may be implemented by the example computing device 800 illustrated in FIG. 8. The computing devices may be located in any suitable number of data centers or geographical locations. In various embodiments, at least some of the functionality of the failure response training system 100 may be provided by the same computing device or by different computing devices. If any of the components of the failure response training system 100 are implemented using different computing devices, then the components and their respective computing devices may be communicatively coupled, e.g., via one or more networks. Each of the components of the failure response training system 100 may represent any combination of software and hardware usable to perform their respective functions. It is contemplated that software testing system 100 may include additional components not shown, fewer components than shown, or different combinations, configurations, or quantities of the components shown.

Operations implemented by the failure response training system 100 may be performed automatically, e.g., without a need for user initiation or user intervention after an initial configuration stage. Operations implemented by the failure response training system 100 may be performed programmatically, e.g., by execution of program instructions on at least one computing device without direct user intervention to generate scenarios and play out those scenarios with user interactivity. In one embodiment, aspects of the failure response training system 100 may be performed continuously and/or repeatedly.

Figure 2:
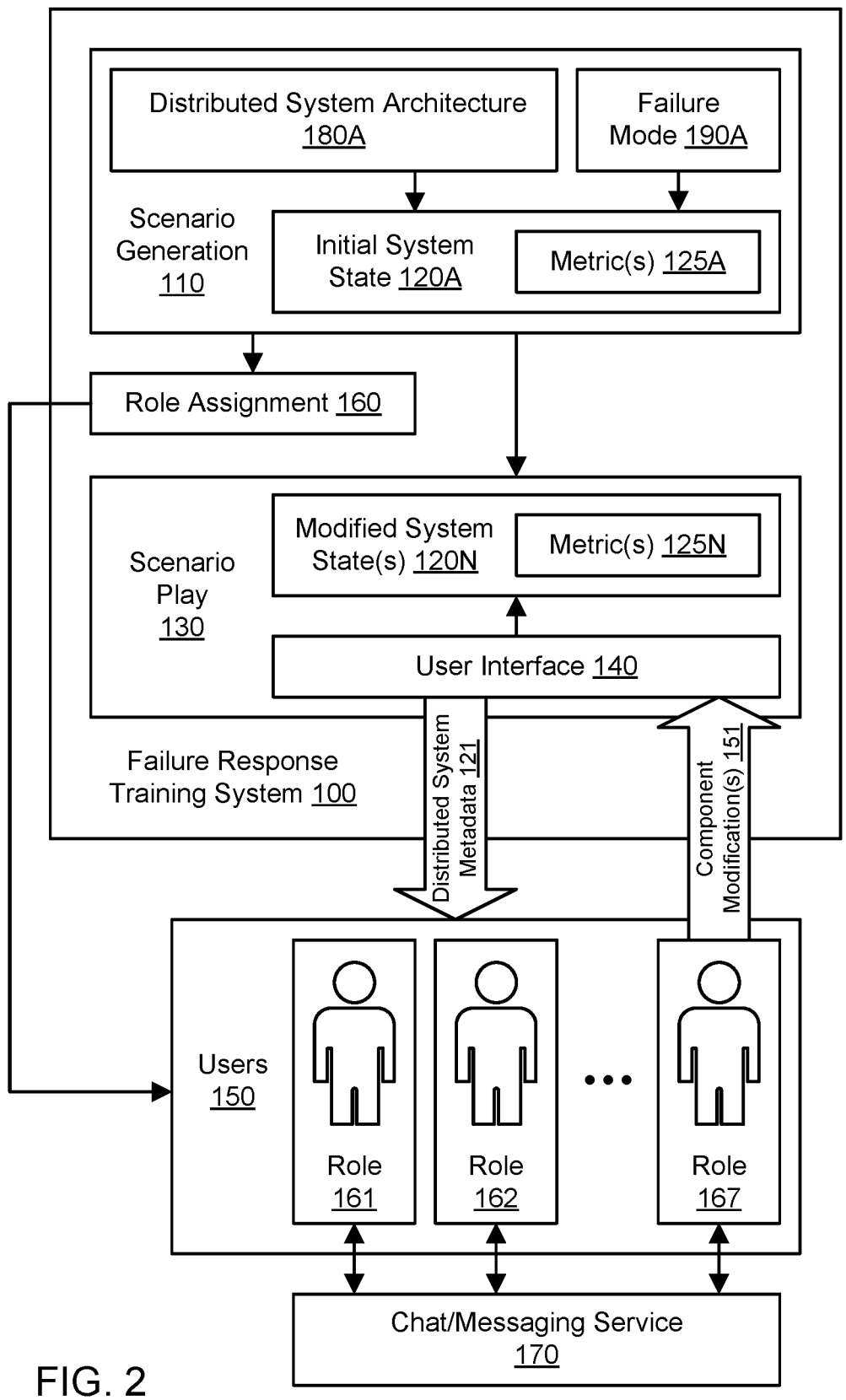
FIG. 2 illustrates further aspects of the example system environment for role-based failure response training for distributed systems, including assignment of different roles to different users, according to some embodiments.

FIG. 2 illustrates further aspects of the example system environment for role-based failure response training for distributed systems, including assignment of different roles to different users, according to some embodiments. In some embodiments, the system 100 may include a component for role assignment 160. The role assignment 160 may assign various roles to various ones of the users 150. For example, the role assignment 160 may assign one role 161 to one user, another role 162 to another user, yet another role 167 to yet another user, and so on. The roles may be selected by users 150 (e.g., based on users' real-world responsibilities) or assigned automatically by the system 100. Some scenarios may have a fixed number of roles or slots for users to be filled. Some scenarios may have a variable number of roles or slots for users. Roles may differ according to their responsibilities and/or capabilities with respect to the scenario. For example, the roles 161-167 may include a call leader who coordinates other users, a communications lead to keep partners and managers informed about the state of the system, an operator or mitigator who controls the configurations of system components, and so on. In some embodiments, one or more of the roles (e.g., role 167) may have the ability to submit the component modifications 151, while other roles may not. The remaining roles may tend to perform analysis, coordination, and/or communication tasks. In some embodiments, the roles 161-167 may change or be reassigned during the scenario play 130. In some embodiments, more than one user may assume a particular role. In some embodiments, the scenario may be played by only one user who assumes one or more roles.

To respond to future operational events as quickly as possible, the system 100 may be used to train teams of users 150 to understand how the various components 181A of a distributed system architecture 180A work individually, how the components work together, how the components can be reconfigured or modified to improve performance and return to normal functionality, and so on. Additionally, the system 100 may be used to train teams of users 150 to communicate effectively and solve problems in a collaborative manner when operational events occur. During the scenario play 130, the users 150 may communicate using a chat or messaging service 170. The chat or messaging service 170 may be used to coordinate a team response to the operational event reflected in the scenario. For example, after analyzing the latest metadata 121, a user in a coordinator role may ask a user in an operator role to take action to reconfigure one of the components 181A. The chat or messaging service 170 may be implemented by the system 100 (e.g., as part of a unified gameplay interface) or may instead represent an existing solution that is used by the users 150 in their day-to-day responsibilities.

Figure 3:
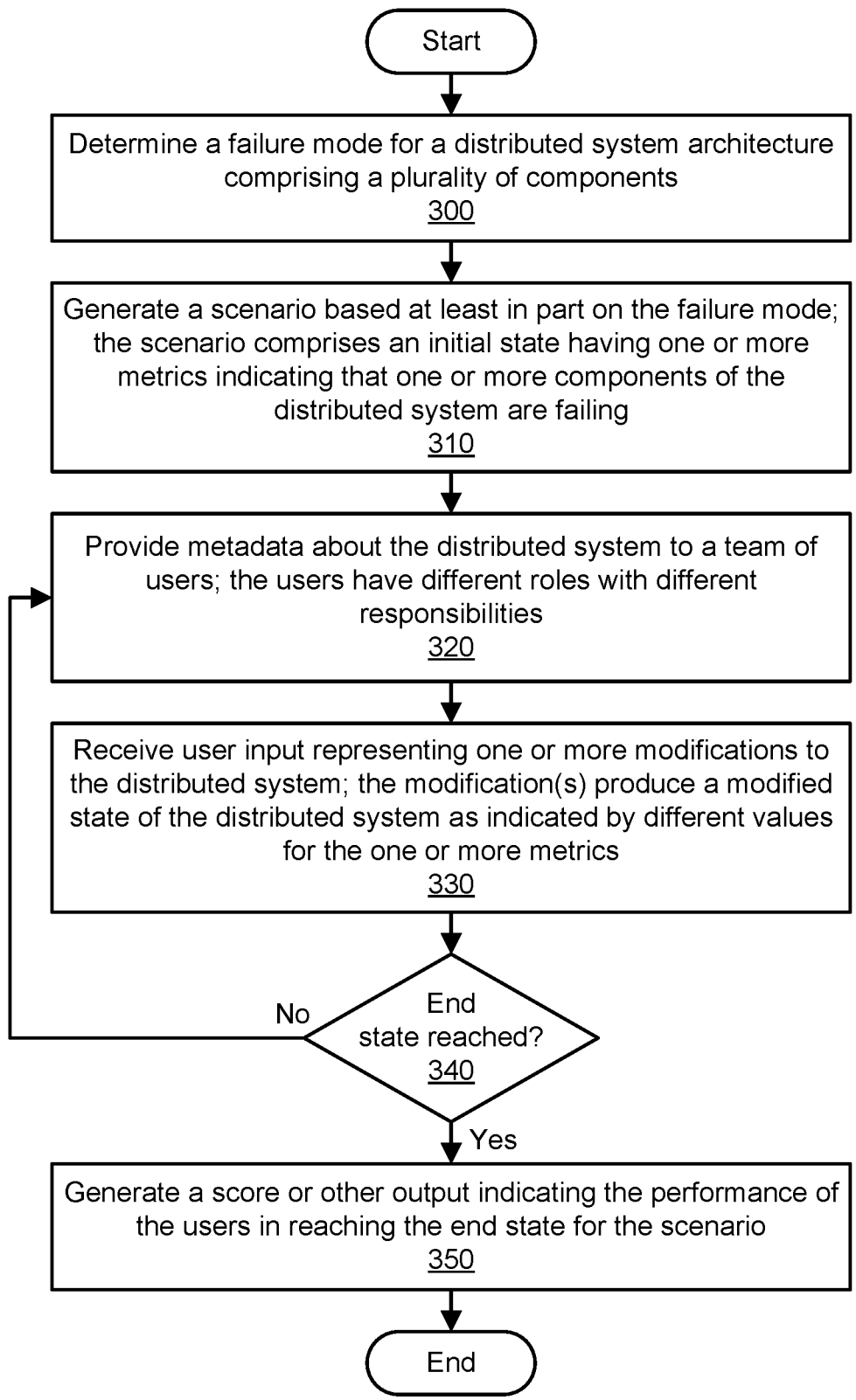
FIG. 3 is a flowchart illustrating a method for role-based failure response training for distributed systems, according to some embodiments.

FIG. 3 is a flowchart illustrating a method for role-based failure response training for distributed systems, according to some embodiments. As shown in 300, a failure mode may be determined for a distributed system architecture comprising a plurality of components. The architecture may include a plurality of components such as services, micro-services, servers, storage resources, network components, and so on. The architecture may include software and/or hardware configurations for the components, e.g., the version of a service installed on a server, the number of hosts in a fleet, the processor configuration and capabilities of a server, the memory configuration of a server, the storage configuration of a server or storage resource, the network configuration of components, and so on. The architecture may include connections or dependencies from component to component, e.g., inputs of components, outputs of components, application programming interfaces (APIs) or other programmatic interfaces of components, and so on. The distributed system architecture may represent a well-known reference architecture, a user-specified architecture, or an automatically generated architecture (e.g., as generated using machine learning techniques). The failure mode may represent a manner in which the selected system architecture can fail. The failure mode may represent a failure mode observed in a real-world environment or an automatically generated failure mode (e.g., as generated using machine learning techniques).

As shown in 310, a scenario may be generated based at least in part on the failure mode and the architecture. The scenario may comprise an initial state having one or more metrics indicating that one or more components of the distributed system are failing according to the selected failure mode. The metric(s) may describe the performance or health of computing devices, services as a whole, and/or networking components using metrics for processor usage, memory usage, storage usage, network usage, and so on. For example, for one particular failure mode, the metric(s) may indicate that a particular server has a 90% processor utilization, resulting in high latency or dropped requests. As another example, for one particular failure mode, the metric(s) may indicate that calls from one service to another service are not being acknowledged or processed, resulting in unavailability of the entire system.

As shown in 320, data describing the state of the distributed system (e.g., metadata about the distributed system) may be provided to a team of users. The users may have different roles with different responsibilities and/or capabilities with respect to the scenario. The users may be presented with metadata regarding the state of the distributed system in the scenario. For example, the metadata may include the metric(s) and their values for the initial state of one or more components of the distributed system.

As shown in 330, user input may be received from one or more of the users. The user input may represent one or more modifications to the distributed system in the scenario. For example, the modifications may include changing the number of hosts in a fleet, changing the configuration of one or more servers, rebooting a server, replacing a server, rerouting network traffic between components, installing software on a server, adding storage to a server, and so on. The modification(s) may produce a modified state of the system. The modified state may be associated with or indicated by different values of the one or more metrics from the initial state. The metadata about the distributed system may be updated as the state of the system changes over time and transitions into one or more modified system states. As indicated in updated metadata, the modified system state may include one or more modified metrics whose values indicate the current health or performance of one or more components.

As shown in 340, the method may determine whether an end state has been reached. The end state may represent a return to normalcy and healthy performance such that the failure is deemed to be eliminated. The end state may be determined according to values of the metric(s) or other metadata about the distributed system. For example, the end state may be reached when the availability of the system increases past a particular threshold value after being too low in the initial state. As another example, the end state may be reached when the latency of request processing by the system decreases below a particular threshold value after being too high in the initial state.

If an end state has not been reached, the method may proceed again to the operation shown in 320. The users may be presented with metadata regarding the modified state of the distributed system in the scenario. For example, the metadata may include the metric(s) and their values for the modified state of one or more components of the distributed system. If an end state has been reached, then as shown in 350, a score or other output may be generated to indicate the performance of the users in reaching the end state for the scenario. The score may be determined based at least in part on the speed or effectiveness of the users' response to the failure. In some embodiments, different scores may be used to certify users at certain levels of proficiency. In some embodiments, the operation shown in 350 may be performed if the scenario times out without restoration of normalcy and healthy performance. By training users to respond to a variety of failure scenarios in a variety of distributed system architectures, the speed and quality of future responses to operational events may be improved.

Figure 4:
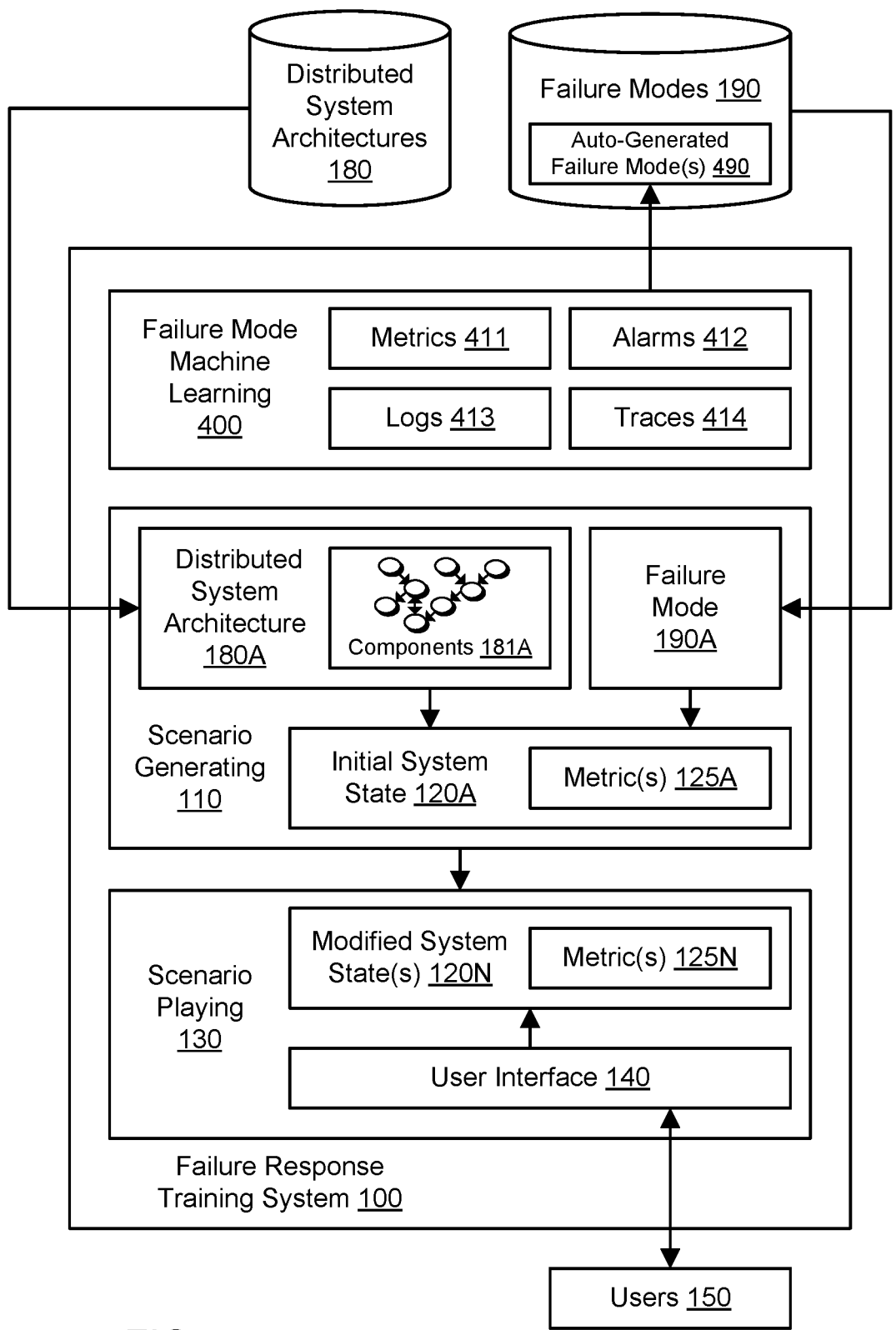
FIG. 4 illustrates further aspects of the example system environment for role-based failure response training for distributed systems, including the use of machine learning techniques to identify failure modes and auto-generate new failure modes, according to some embodiments.

FIG. 4 illustrates further aspects of the example system environment for role-based failure response training for distributed systems, including the use of machine learning techniques to identify failure modes and auto-generate new failure modes, according to some embodiments. The failure response training system 100 may include a component for failure mode machine learning 400. In some embodiments, the failure mode machine learning 400 may use machine learning techniques to identify new failure modes, e.g., based (at least in part) on runtime characteristics that indicate the health or performance of distributed systems. Distributed systems that are interacting with real-world clients in production environments may be monitored to capture runtime characteristics or other metadata that can be used to identify failure modes. The runtime characteristics may include metrics 411 that describe the performance of computing devices, services as a whole, and/or networking components using metrics for processor usage, memory usage, storage usage, network usage, and so on. The runtime characteristics may include alarms 412 that are generated when the performance of one or more components of a distributed system falls below some threshold (e.g., a service-level agreement). The runtime characteristics may include logs 413 generated by individual services or servers, e.g., to capture aspects of client requests and responses to those requests. Service logs 113 may indicate application programming interfaces (APIs) that were invoked by service calls, parameter values (inputs) of calls, responses (outputs) to calls, timestamps of calls, and so on. The runtime characteristics may include request traces 414 that represent the flow of requests from component to component (e.g., from service to service) within a distributed system. To perform call tracing, trace headers may be embedded in service requests, and the flow of a particular trace header from service to service may be used to identify call chains and dependency relationships among services.

Using the failure mode machine learning 400, machine learning techniques may be applied to these runtime characteristics to identify characteristics associated with failures of distributed systems. For example, a decision tree or other model may be used to classify failure modes. As another example, a neural network or other machine learning model may be trained with sets of characteristics for known failure modes in order to identify, in the runtime characteristics, new failure modes not found in the training set. Machine learning techniques may include artificial intelligence techniques. Machine learning techniques may be implemented using one or more systems that learn from data, identify patterns, and make predictions or other decisions with minimal human intervention (e.g., after human input during an initial configuration phase such as model training). Machine learning may include generating and using one or more models that can programmatically output results (e.g., indicators of redundant logic) based (at least in part) on input (e.g., the logic itself and/or dependency relationships associated with the logic). Such a model may undergo a training process (e.g., using a training data set) such that it learns patterns sufficient to make inferences about future events. In some embodiments, new failure modes may be learned from intermediate states of prior scenarios, e.g., where user actions have failed to restore a particular distributed system to normalcy.

In some embodiments, the failure mode machine learning 400 may use machine learning techniques to automatically generate new failure modes. For example, based (at least in part) on a training set of known failure modes, the failure mode machine learning 400 may train a model to generate new failure modes that represent new ways in which distributed systems can fail. As shown in FIG. 4, the failure mode machine learning 400 may create one or more auto-generated failure modes 490 that can then be used to generate scenarios for users 150. An auto-generated failure mode 490 may represent a change to a metric value in a known failure mode. For example, if a known failure mode is associated with a CPU utilization metric of 90% in a server, then an auto-generated failure mode 490 may include a different value for that metric. An auto-generated failure mode 490 may represent a combination of two or more known failure modes. For example, if a first known failure mode includes one server's clock falling behind such that its messages are rejected by recipients, and a second known failure mode includes a retry storm resulting from a network fault between two components, then an auto-generated failure mode 490 may represent a combination of those two circumstances. An auto-generated failure mode 490 may be generated based (at least in part) on intermediate states of prior scenarios, e.g., where user actions have failed to restore a particular distributed system to normalcy. An auto-generated failure mode 490 may be used in generating a new scenario for the users 150.

Figure 5:
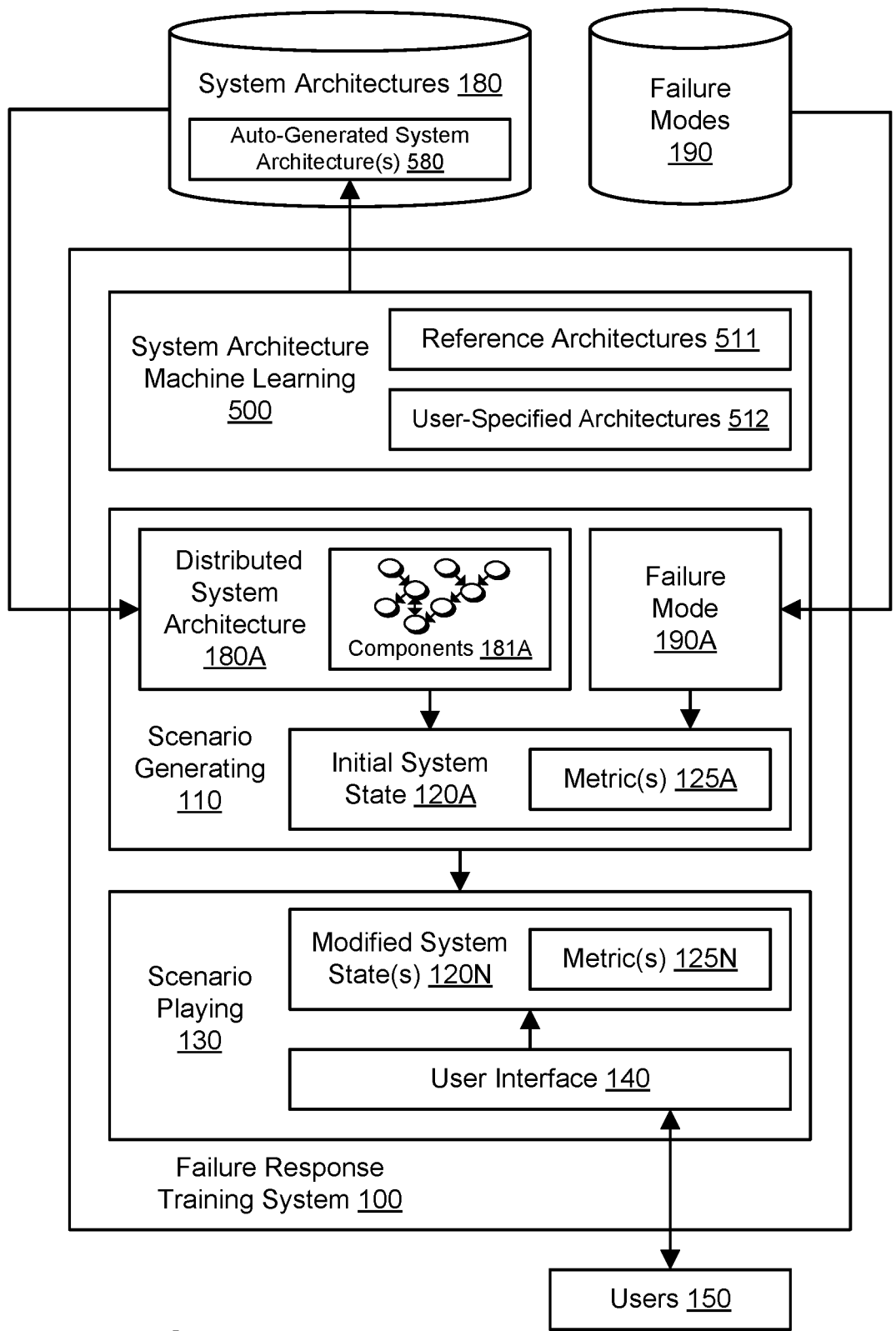
FIG. 5 illustrates further aspects of the example system environment for role-based failure response training for distributed systems, including the use of machine learning techniques to auto-generate new system architectures, according to some embodiments.

FIG. 5 illustrates further aspects of the example system environment for role-based failure response training for distributed systems, including the use of machine learning techniques to auto-generate new system architectures, according to some embodiments. The failure response training system 100 may include a component for system architecture machine learning 500. In some embodiments, the system architecture machine learning 500 may use machine learning techniques to automatically generate new distributed system architectures. The system architecture machine learning 500 may take, as input, one or more well-known reference architectures 511 for distributed systems. Reference architectures 511 may represent common patterns for types of distributed systems. For example, the reference architectures 511 may include a system architecture for a media streaming service, a system architecture for a web server, and so on. The system architecture machine learning 500 may take, as input, one or more user-specified architectures 512. The user-specified architectures may represent arbitrary sets of components and relationships between components as specified by users, e.g., users 150 or users tasked with creating scenarios.

As shown in FIG. 5, the system architecture machine learning 500 may create one or more auto-generated system architectures 580 that can then be used to generate scenarios for users 150. For example, using the system architecture machine learning 500, a neural network or other machine learning model may be trained with sets of characteristics for known system architectures 511 and/or 512 in order to generate new system architectures 580 not found in the training set. An auto-generated system architecture 580 may include a set of interconnected components and their relationships, e.g., as indicated by application programming interfaces (APIs) that are called by services. Individual components of an auto-generated system architecture 580 may be associated with metrics whose values may vary, e.g., such that some values represent healthy performance and some values represent failure. In some embodiments, an auto-generated system architecture 580 may be created based (at least in part) on another auto-generated system architecture.

An auto-generated system architecture 580 may represent a change to a configuration of a component in a known system architecture. For example, if a known system architecture is associated with fleet of servers of a particular size, then an auto-generated system architecture 580 may include a different size for that fleet. As another example, if a known system architecture has a server with a particular processor or memory configuration, then an auto-generated system architecture 580 may include a different processor or memory configuration for that server. An auto-generated system architecture 580 may represent a combination of components from two or more known system architectures. For example, if a first known system architecture includes one storage service that is used to store input data for request processing, and a second known system architecture includes another storage service that is used to store output data from request processing, then an auto-generated system architecture 580 may represent a combination of both storage services. An auto-generated system architecture 580 may be used in generating a new scenario for the users 150.

Figure 6:
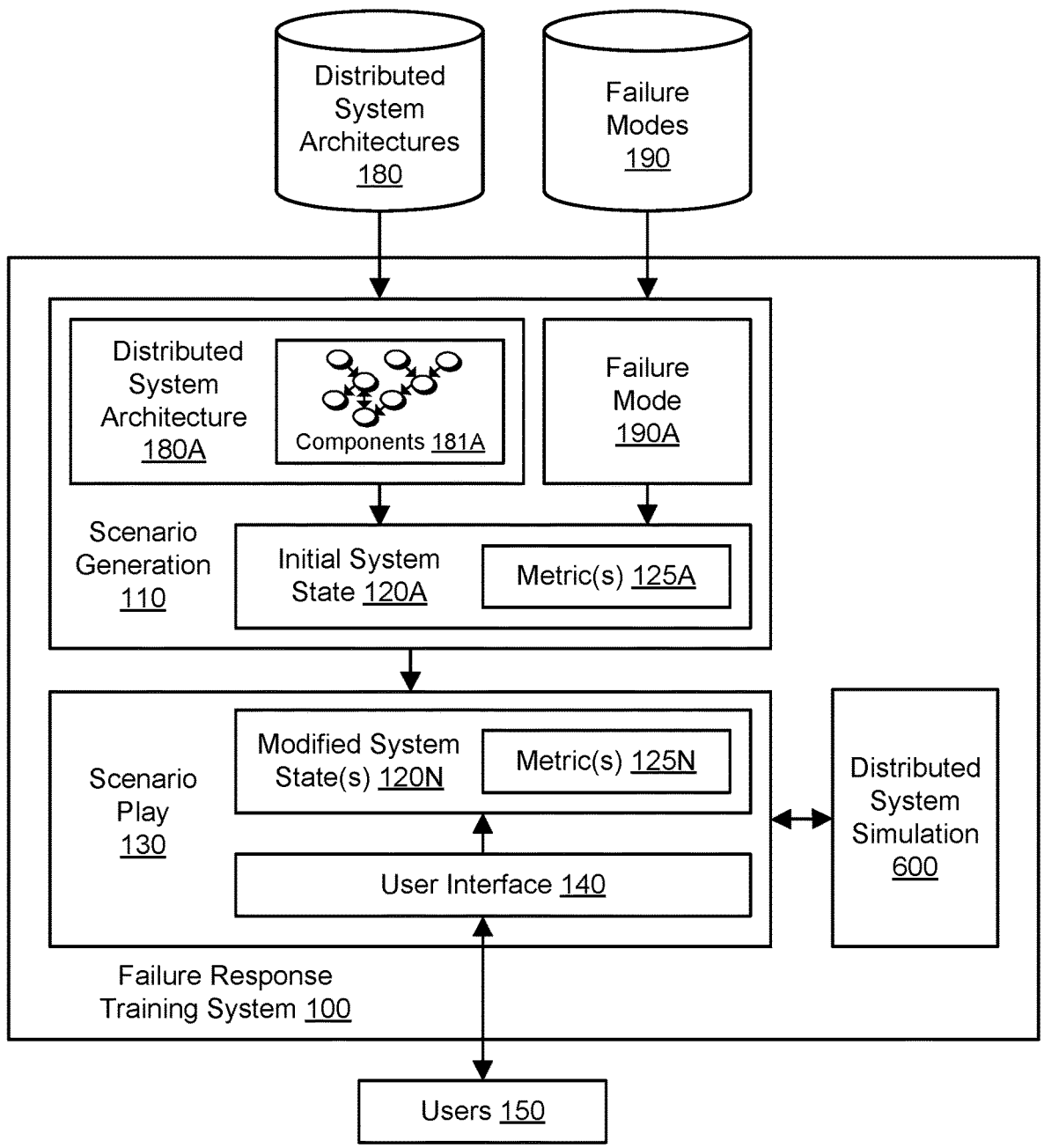
FIG. 6 illustrates further aspects of the example system environment for role-based failure response training for distributed systems, including simulation of the distributed system during the scenario, according to some embodiments.

FIG. 6 illustrates further aspects of the example system environment for role-based failure response training for distributed systems, including simulation of the distributed system during the scenario, according to some embodiments. In some embodiments, a distributed system may be simulated using a distributed system simulation component 600 to implement the scenario play 130. The components of the distributed system, their configurations, and their relationships may be simulated according to the architecture 180A and the failure mode 190A chosen for the scenario. The simulation 600 may simulate the initial system state 120A as well as one or more modified system states 120N. After being configured to represent the initial state 120A, the simulation 600 may produce system metadata 121 as output and may be modified based on component modifications 151 as input. In simulating the selected architecture 180A and failure mode 190A, the underlying services may not be run in an execution environment. In some embodiments, the simulation 600 may use one computing device rather than a distributed set of computing devices. In some embodiments, the simulation 600 may simulate a plurality of services or service hosts using a single computing device.

Figure 7:
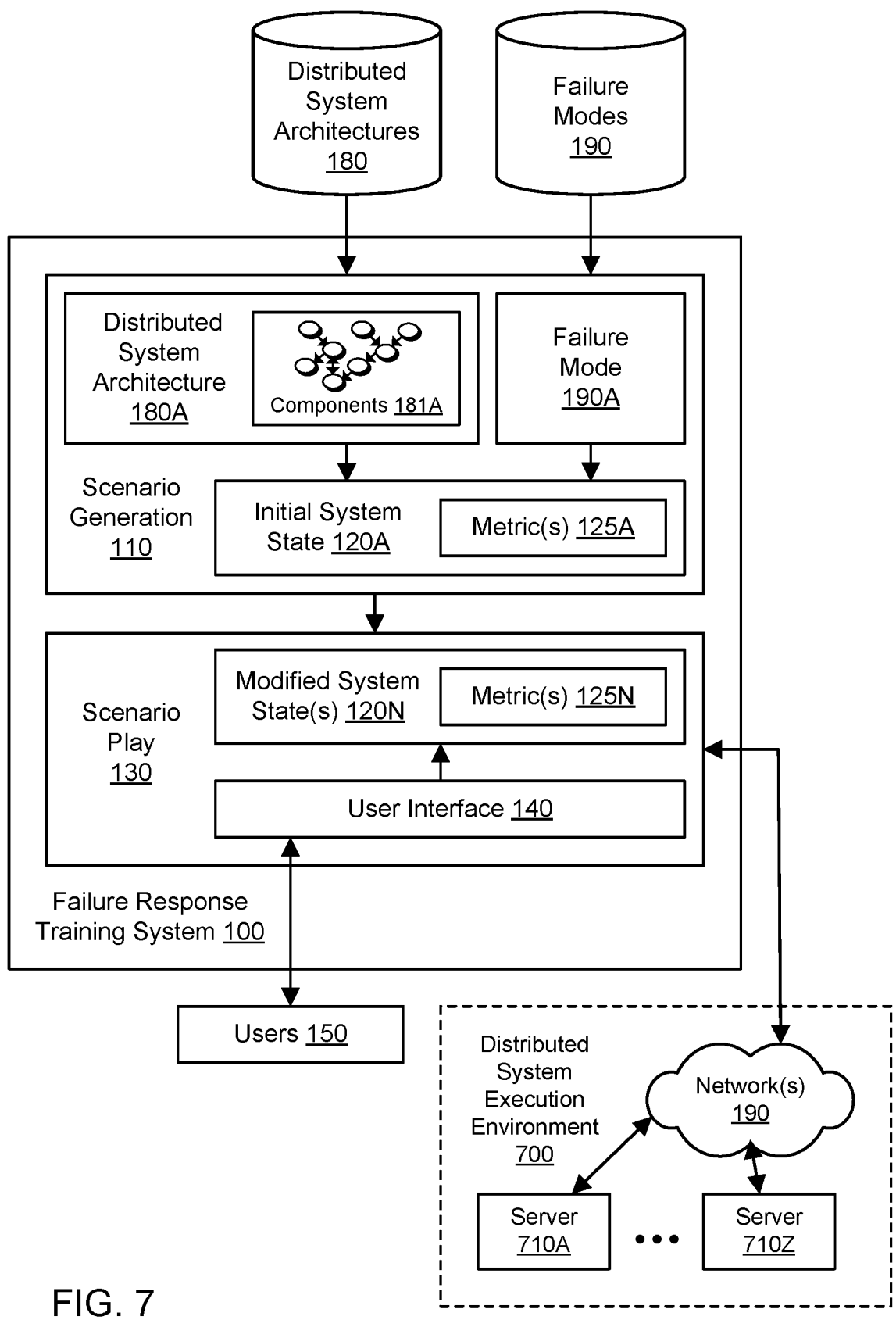
FIG. 7 illustrates further aspects of the example system environment for role-based failure response training for distributed systems, including execution of the distributed system in an execution environment during the scenario, according to some embodiments.

FIG. 7 illustrates further aspects of the example system environment for role-based failure response training for distributed systems, including execution of the distributed system in an execution environment during the scenario, according to some embodiments. In some embodiments, a distributed system may be executed in an execution environment 700 to implement the scenario play 130. The components of the distributed system, their configurations, and their relationships may be configured according to the architecture 180A and the failure mode 190A chosen for the scenario. The execution environment 700 may include a plurality of servers or hosts 710A-710Z that implement the components of the distributed system. The execution environment 700 may represent a pre-production or test environment in which servers 710A-710Z do not interact with live, real-world clients.

The scenario in the execution environment 700 may be configured and/or driven by requests from the failure response training system such that servers 710A-710Z reflect the chosen failure mode 190A. For example, if the failure mode 190A includes a server whose clock has fallen behind or a server whose CPU utilization is 90%, then the failure response training system 100 may configure the servers 710A-710Z accordingly. As the scenario plays out, the components (e.g., servers 710A-710Z) in the execution environment 700 may be modified according to input from the users 150. For example, one of the servers 710A-710Z may be rebooted, replaced, or reconfigured according to user input. The performance of the servers 710A-710Z may be measured again using relevant metrics to gauge the effect of the user-specified modifications on the health of the distributed system.

Components of the distributed system such as servers 710A-710Z may be implemented using a service-oriented system. The service-oriented system may follow a service-oriented architecture and may include multiple services (as implemented by servers 710A-710Z) configured to communicate with each other (e.g., through message passing) to carry out various tasks via one or more networks 190. Although servers 710A and 710Z are illustrated for purposes of example, it is contemplated that any suitable number and configuration of servers and services may be used with the service-oriented system. A service may be implemented using an individual service host or a fleet of multiple service hosts. Services may be implemented using a plurality of hosts or servers, any of which may be implemented by the example computing device 800 illustrated in FIG. 8. The hosts or servers may be located in any suitable number of data centers or geographical locations. In one embodiment, multiple services and/or instances of the same service may be implemented using the same host.

Services may send service requests to other services and receive corresponding responses to those requests. A service may offer one or more application programming interfaces (APIs) or other programmatic interfaces through which another service may request the functionality of the service. In some cases, a first service may call a second service, the second service may call a third service to satisfy the request from the first service, and so on. For example, to build a web page dynamically, numerous services may be invoked in a hierarchical manner to build various components of the web page. The service-oriented system in the execution environment 700 may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.).

In general, services may be configured to perform any of a variety of processes. The services 110A-110N described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

In some embodiments, servers 710A-710Z and other distributed system components may convey network-based service requests via one or more networks 190. In various embodiments, the network(s) 190 may encompass any suitable combination of networking hardware and protocols necessary to establish network-based communications between the client and the system 100. For example, the network(s) 190 may generally encompass the various telecommunications networks and service providers that collectively implement the Internet. The network(s) may also include private networks such as local area networks (LANs) or wide area networks (WANs) as well as public or private wireless networks. For example, one or more of the servers 710A-710Z and the system 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between one component and the Internet as well as between the Internet and the component. It is noted that in some embodiments, components may communicate using a private network rather than the public Internet.

In some embodiments, the execution environment 700 may be implemented using resources of a provider network. The provider network may include numerous data centers hosting various services and resource pools of computing resources, such as collections of physical and/or virtualized computer servers, storage devices, networking equipment and the like, that are used to implement and distribute the infrastructure and services offered by the provider. The provider network may be hosted in the cloud and may be termed a cloud provider network. The provider network may offer multi-tenancy using its various resources pools and may be termed a multi-tenant provider network. Computing resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). The provider network may offer a set of services whose functionality can be invoked by clients internal or external to the provider network. For example, the services may include virtualized computing services, virtualized storage services, messaging or chat services, queueing services, media streaming services, and/or "serverless" computing solutions that allocate and manage servers and hosts on behalf of clients, e.g., to execute client-specified functions. A number of different types of computing devices may be used singly or in combination to implement the resources of the provider network in different embodiments, including general purpose or special purpose computer servers, storage devices, network devices, and so on.

In some embodiments, components of the execution environment 700 may be provisioned and configured in order to run a chosen scenario. A resource manager of a multi-tenant provider network may manage access to a set of computing resources. The computing resource may include, for example, various pools of compute instances as discussed above. To play the scenario, the system 100 may interact with the resource manager to provision and reserve one or more of the computing resources for use during the scenario. The execution environment 700 may be configured to resemble some aspects of the distributed system architecture 180A, e.g., with the number and configuration of computing resources, the same versions of services, and so on. After the scenario is complete, the resource manager may deprovision the one or more computing resources and return them to the pool(s) of available resources for later use by other clients.

Illustrative Computer System

In at least some embodiments, a computer system that implements a portion or all of one or more of the technologies described herein may include a computer system that includes or is configured to access one or more computer-readable media. FIG. 8 illustrates such a computing device 800. In the illustrated embodiment, computing device 800 includes one or more processors 810A-810N coupled to a system memory 820 via an input/output (I/O) interface 830. Computing device 800 further includes a network interface 840 coupled to I/O interface 830.

In various embodiments, computing device 800 may be a uniprocessor system including one processor or a multiprocessor system including several processors 810A-810N

(e.g., two, four, eight, or another suitable number). Processors 810A-810N may include any suitable processors capable of executing instructions. For example, in various embodiments, processors 810A-810N may be processors implementing any of a variety of instruction set architectures (ISAs), such as the x86, PowerPC, SPARC, or MIPS ISAs, or any other suitable ISA. In multiprocessor systems, each of processors 810A-810N may commonly, but not necessarily, implement the same ISA.

System memory 820 may be configured to store program instructions and data accessible by processor(s) 810A-810N. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 820 as code (i.e., program instructions) 825 and data 826. In the illustrated embodiment, system memory 820 also stores program code and data that implement aspects of the failure response training system 100 discussed above.

In one embodiment, I/O interface 830 may be configured to coordinate I/O traffic between processors 810A-810N, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processors 810A-810N). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processors 810A-810N.

Network interface 840 may be configured to allow data to be exchanged between computing device 800 and other devices 860 attached to a network or networks 850. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-readable (i.e., computer-accessible) medium configured to store program instructions and data as described above for implementing embodiments of the corresponding methods and apparatus. For example, system memory 820 may store program code and data associated with the failure response training system 100. In some embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 800 via I/O interface 830. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 800 as system memory 820 or another type of memory. Further, a computer-readable medium may include transmission media or signals such as electrical, electromagnetic, or digital signals, conveyed via a communication medium such as a network and/or a wireless link, such as may be implemented via network interface 840. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a failure response training system configured to train a plurality of users to respond to operational events, the failure response training system comprising one or more processors and one or more memories to store computer-executable instructions that, when executed, cause the one or more processors to:
   determine a failure mode associated with an architecture for a distributed system comprising a plurality of components, wherein the failure mode represents a manner in which the distributed system fails;
   generate a game scenario based at least in part on the failure mode, wherein the game scenario comprises an initial state of the distributed system, wherein a particular one or more of the components are experiencing failure in the initial state, and wherein the failure is indicated by one or more initial values for one or more health or performance metrics descriptive of the particular one or more of the components;
   provide, to the plurality of users, data describing the initial state of the distributed system, wherein individual ones of the users are associated with individual roles;
   receive, from one or more of the users, input representing modification of a configuration of at least one of the components; and
   determine a modified state of the distributed system based at least in part on the input, wherein a performance of the distributed system in the modified state is indicated by one or more modified values for the one or more health or performance metrics, and wherein the one or more modified values differ from the one or more initial values.

2. The system as recited in claim 1, wherein the one or more memories store additional computer-executable instructions that, when executed, cause the one or more processors to:
   based at least in part on the one or more modified values for the one or more health or performance metrics, determine that the modified state represents an end state in which the distributed system is not failing; and
   provide, to the plurality of users, an indication that the game scenario has reached the end state.

3. The system as recited in claim 2, wherein the one or more memories store additional computer-executable instructions that, when executed, cause the one or more processors to:
   determine a score for the plurality of users based at least in part on a time elapsed between the initial state and the end state.

4. The system as recited in claim 1, wherein at least some of the individual roles have different responsibilities with respect to the game scenario.

5. A method, comprising:
   determining, by a failure response training system, a failure mode associated with an architecture for a distributed system comprising a plurality of components;
   generating, by the failure response training system, a training scenario based at least in part on the failure mode, wherein the training scenario comprises an initial state of the distributed system, and wherein the initial state is associated with one or more initial values for one or more health or performance metrics, wherein the one or more initial values are indicative of a failure of one or more of the components;
   providing, by the failure response training system to a plurality of users, data describing the initial state of the distributed system;
   receiving, by the failure response training system from one or more of the users, input representing modification of at least one of the components; and
   determining, by the failure response training system, a modified state of the distributed system based at least in part on the input, wherein a performance of the distributed system in the modified state is indicated by one or more modified values for the one or more health or performance metrics, and wherein the one or more modified values differ from the one or more initial values.

6. The method as recited in claim 5, further comprising:
   simulating, by the failure response training system, the plurality of components represented in the training scenario.

7. The method as recited in claim 5, further comprising:
   implementing the plurality of components represented in the training scenario using a plurality of resources of a multi-tenant provider network.

8. The method as recited in claim 5, further comprising:
   generating, by the failure response training system, the architecture for the distributed system based on one or more user-specified or reference architectures.

9. The method as recited in claim 5, wherein the failure mode is determined using one or more machine learning techniques based on one or more observed failure modes in one or more additional architectures.

10. The method as recited in claim 5, wherein the failure mode is determined using one or more machine learning techniques based on one or more health or performance metrics associated with the distributed system.

11. The method as recited in claim 5, further comprising:
    based at least in part on the one or more modified values for the one or more health or performance metrics, determining that the modified state represents an end state in which the distributed system is not failing; and
    determining a score for the plurality of users based at least in part on a manner in which the end state is reached.

12. The method as recited in claim 5, wherein individual ones of the users are associated with individual roles, and wherein entry of the input is coordinated by the plurality of users via a messaging interface.

13. One or more non-transitory computer-readable storage media storing program instructions that, when executed on or across one or more processors, perform:
    determining a failure mode associated with an architecture for a distributed system comprising a plurality of components, wherein the failure mode represents a manner in which the distributed system fails;
    generating a game scenario based at least in part on the failure mode, wherein the game scenario comprises an initial state of the distributed system, and wherein the initial state is associated with one or more initial values for one or more health or performance metrics, wherein the one or more initial values are indicative of a failure of a particular one or more of the components;

providing, to a plurality of users, the one or more initial values for the one or more health or performance metrics, wherein individual ones of the users are associated with individual roles;

receiving, from one or more of the users, input representing modification of at least one of the components; and determining a modified state of the distributed system based at least in part on the input, wherein the modified state is associated with one or more modified values for the one or more health or performance metrics, and wherein the one or more modified values differ from the one or more initial values.

14. The one or more non-transitory computer-readable storage media as recited in claim 13, further comprising additional program instructions that, when executed on or across the one or more processors, perform:

simulating a performance of the plurality of components represented in the game scenario.

15. The one or more non-transitory computer-readable storage media as recited in claim 13, further comprising additional program instructions that, when executed on or across the one or more processors, perform:

implementing the plurality of components represented in the game scenario using a plurality of services of a multi-tenant provider network.

16. The one or more non-transitory computer-readable storage media as recited in claim 13, further comprising additional program instructions that, when executed on or across the one or more processors, perform:

generating the architecture for the distributed system using one or more machine learning techniques; and generating an additional architecture for an additional distributed system using the one or more machine learning techniques based at least in part on the architecture.

17. The one or more non-transitory computer-readable storage media as recited in claim 13, wherein the failure mode is determined based at least in part on one or more observed failure modes in one or more earlier game scenarios.

18. The one or more non-transitory computer-readable storage media as recited in claim 13, wherein the failure mode is determined using one or more machine learning techniques based on one or more runtime characteristics of the distributed system.

19. The one or more non-transitory computer-readable storage media as recited in claim 13, further comprising additional program instructions that, when executed on or across the one or more processors, perform:

based at least in part on the one or more modified values for the one or more health or performance metrics, determining that the modified state represents an intermediate state in which the distributed system is continuing to fail; and determining a score for the plurality of users based at least in part on a manner in which the intermediate state is reached.

20. The one or more non-transitory computer-readable storage media as recited in claim 13, wherein at least some of the individual roles vary in respective input capabilities for the scenario, and wherein entry of the input is coordinated by the plurality of users via a chat interface.

* * * * *